US011469565B2

(12) United States Patent
Karrasch

(10) Patent No.: US 11,469,565 B2
(45) Date of Patent: Oct. 11, 2022

(54) ELECTRICAL TERMINAL CRIMPING DEVICE WHICH PREVENTS REMOVAL OF DEFECTIVE CRIMP

(71) Applicant: TE Connectivity Services GmbH, Schaffhausen (CH)

(72) Inventor: Christopher John Karrasch, Middletown, PA (US)

(73) Assignee: TE Connectivity Solutions GmbH

( * ) Notice: Subject to any disclaimer, the term of this patent is extended or adjusted under 35 U.S.C. 154(b) by 0 days.

(21) Appl. No.: 17/159,679

(22) Filed: Jan. 27, 2021

(65) Prior Publication Data

US 2022/0239048 A1 Jul. 28, 2022

(51) Int. Cl.
*B23P 19/00* (2006.01)
*H01R 43/048* (2006.01)

(52) U.S. Cl.
CPC ........ *H01R 43/048* (2013.01); *Y10T 29/5313* (2015.01)

(58) Field of Classification Search
CPC ......... Y10T 29/53235; Y10T 29/49185; Y10T 29/49181; Y10T 29/53213; Y10T 29/53209; Y10T 29/53226; Y10T 29/5313; Y10T 29/5193; Y10T 29/49174; Y10T 29/5327; Y10T 29/49826; Y10T 29/53065; Y10T 29/53522; H01R 43/048; H01R 43/058; H01R 43/04; Y10S 72/712
USPC ......... 29/729, 747, 748, 751, 753, 761, 854, 29/857, 861
See application file for complete search history.

(56) References Cited

U.S. PATENT DOCUMENTS 8,819,925 B2 * 9/2014 Onuma .............. H01R 43/0486 29/753
2020/0036151 A1 * 1/2020 Dobson, Jr. .......... H01R 43/048

* cited by examiner

*Primary Examiner* — Thiem D Phan

(57) ABSTRACT

A wire termination apparatus for terminating an electrical terminal to a wire or cable include an upper tooling member which is movable between an open position and a closed position. A lower tooling member is attached to a base member of a frame of the wire termination apparatus. A process analyzer determines if a crimped terminal is properly crimped to a wire or cable. If the process analyzer determines that the terminal has not been properly crimped to the wire cable, the removal of the defectively crimped terminal and wire or cable from the wire termination apparatus is prevented until a code or key is entered.

6 Claims, 17 Drawing Sheets

ELECTRICAL TERMINAL CRIMPING DEVICE WHICH PREVENTS REMOVAL OF DEFECTIVE CRIMP

FIELD OF THE INVENTION

The present invention is directed to an electrical terminal crimping systems and method that are used for crimping terminals to ends of wires, and, more specifically, to retaining a defectively crimped terminal in the crimping machine.

BACKGROUND OF THE INVENTION

Electrical terminals can be crimped to electrical conductors, such as electrical wires or cables, during a crimping operation to form an electrical lead. In electrical systems, electrical leads are used to provide an electrical signal path between two electrical components in the same or different electrical devices. The terminals are crimped to the conductors by a crimping machine, such as bench terminator or a lead-making machine. In a typical crimping operation, a terminal is placed in a crimping zone of the crimping machine and a wire is inserted into a ferrule or barrel of the terminal. A ram of the crimping machine moves toward the terminal along a crimp stroke. The ram pinches or crimps the terminal around and onto the wire, which mechanically and electrically connects the wire to the terminal and forms the lead.

The electrical terminal is deformed around the wire during the crimping process. The final shape of the terminal after crimping is critical to electrical performance. There are many difficulties that could lead to a defective crimp, such as wire strands that are not in the crimp, the wrong crimp height, bad terminal positioning in the crimp tooling, etc. Many of these difficulties can be detected by monitoring the force required to deform the terminal around the wire.

It is current practice in the industry to use a process analysis monitor to analyze the crimping process to determine if the crimp is good or defective. To keep the defective crimp from entering a final product, some systems will cut the wire or cable to remove the defective crimp. However, in large cable crimp applications, such as high voltage cables for electric vehicles for instance, it is not convenient for the termination machine to cut off the defective crimp.

It would therefore be beneficial to have a device and method to effectively and efficiently prevent the operator from removing a defectively crimped terminal from the terminal crimping machine without destroying the wire or cable and crimped terminal, thereby reducing the chance that the defective crimp being used in an end product.

SUMMARY OF THE INVENTION

In a first embodiment, after a defective crimp is detected, the defectively crimped terminal and cable or wire is held in the wire termination apparatus by keeping the crimp tooling in close proximity or touching the crimped terminal. This embodiment is directed to a wire termination apparatus for terminating an electrical terminal to a cable. The wire termination apparatus includes an upper tooling member attached to a ram. The upper tooling member has a crimp die and is movable between an open position and a closed position. A lower tooling member is attached to a base member of a frame of the wire termination apparatus. A clamping device is position proximate the lower tooling member. The clamping device is configured to position and hold the cable. A sensor is positioned on the wire termination apparatus and is configured to feed data to a process analyzer to determine if the terminal has been properly crimped to the cable as the upper tooling is moved from the open position to the closed position. If the process analyzer determines that the terminal has not been properly crimped to the cable, the upper tooling member is prevented from returning to the open position or returned to a position in close proximity or touching the crimped terminal to prevent the removal of the terminal from the wire termination apparatus.

In a second embodiment, the cable is locked in a cable clamp prior to cable termination. If during termination, a process analyzer determines the crimp to be defective, the guards on the termination apparatus will be prevented from being opened so that the cable cannot be released from the cable clamp. This embodiment is directed to a clamping device for use with a wire termination apparatus. The wire terminating apparatus has a movable guard that prevents the operator from accessing pinch points or the release handle of the clamp when the guard is closed. This embodiment is directed to a method of terminating a cable to an electrical terminal, the method comprising: positioning the terminal in a terminal in a terminal holding device; inserting a cable into the terminal; clamping the cable to retain the cable in position with a clamping device; moving termination tooling from an open position to a closed position to secure the terminal on the cable; moving the termination tooling toward the open position; and monitoring a connection between the terminal and the cable to determine if the terminal is properly secured to the cable.

The clamping device of the second embodiment has a first clamp arm and a second clamp arm. A slide extends between the first clamp arm and the second clamp arm. A linkage is attached to the slide. A handle is attached to the linkage through a handle pivot block. Raising the handle moves the slide to rotate the clamp arms to a closed position where they are locked around the cable. An over center condition between the slide, the link, the handle pivot block and the adjustment block prevents the clamp arms from opening. The clamp is mounted on a base that is able to move axially during the crimping process when terminal and cable extrusion causes the cable to increase in length axially. During the crimping process, a sensor will send information to a process analyzer to determine if the crimp is acceptable or defective. If the process analyzer of the termination apparatus determines the crimp to be defective, the termination apparatus will prevent the safety guards from being opened. This will prevent the operator from accessing the clamp handle to unlock the cable, thus preventing the removal of the defective terminal and cable from the wire termination apparatus.

In a third embodiment, the cable is held in place before, during, and after crimping by a spring-loaded clamp. If a defective crimp is detected, an air cylinder will apply extra force to the clamp jaws to prevent the defective crimp from being removed from the termination apparatus. An embodiment is directed to a method of terminating a cable to an electrical terminal, the method comprising: positioning the terminal in a terminal in a terminal holding device; inserting a cable into the terminal; clamping the cable to retain the cable in position with a clamping device; moving termination tooling from an open position to a closed position to secure the terminal on the cable; moving the termination tooling toward the open position; and monitoring a connection between the terminal and the cable to determine if the terminal is properly secured to the cable. If the terminal is not properly secured to the cable, the termination tooling is prevented from being moved to the open position. If the terminal is properly secured to the cable, the termination tooling is moved to the open position.

The clamping device of the third embodiment has a first clamp arm and a second clamp arm. A slide extends between the first clamp arm and the second clamp arm. A linkage is attached to the slide. A handle is attached to the linkage. Raising the handle allows springs to push the slide to rotate the clamp arms to a closed position where they are held around the cable with a light force. This light force allows the cable to slide in the clamp arms during the crimping process when terminal and cable extrusion causes the cable to increase in length axially. During the crimping process, a sensor will send information to a process analyzer to determine if the crimp is acceptable or defective. If the process analyzer of the termination apparatus determines the crimp to be defective, the termination apparatus will apply extra clamping force to the clamp arms via an air cylinder. This will prevent the removal of the defective terminal and cable from the wire termination apparatus.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
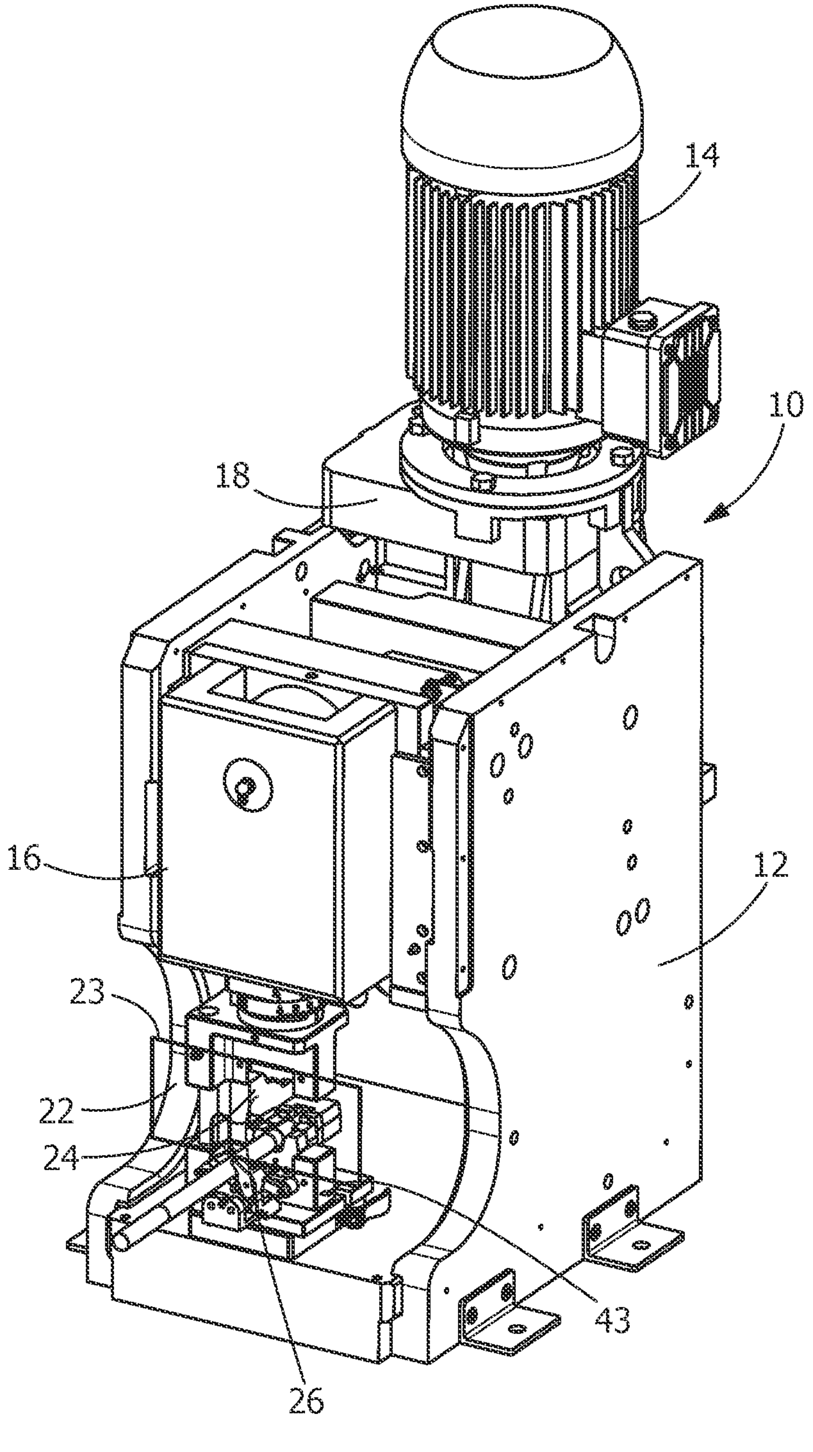
FIG. 1 is a perspective view of an illustrative cable termination apparatus according to the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
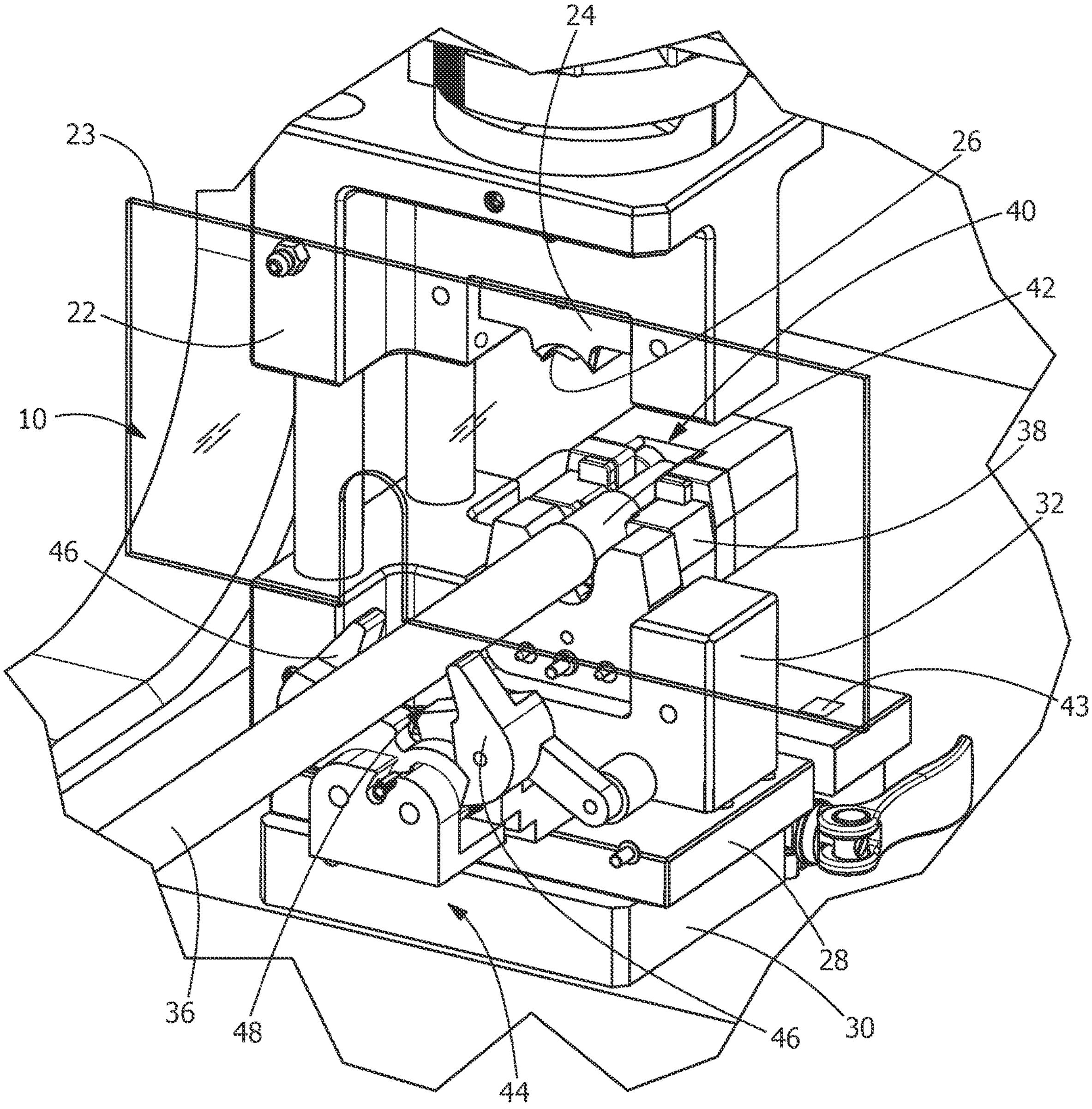
FIG. 2 is an enlarged perspective of illustrative applicator tooling of FIG. 1 shown in an open position.
Figure 4:
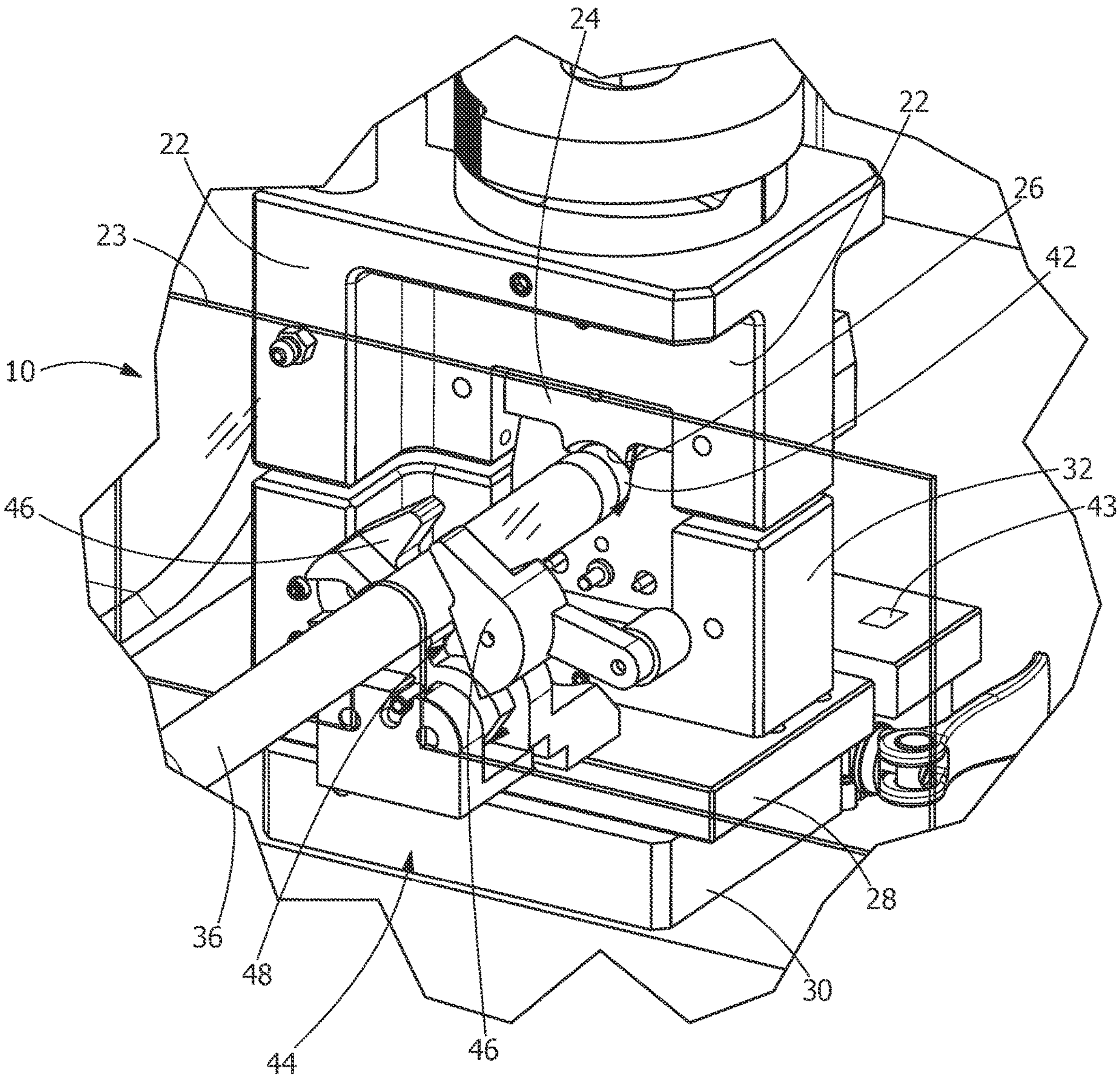
FIG. 4 is an enlarged perspective of illustrative applicator tooling of FIG. 2, with the applicator tooling moved to a closed position.

As shown in FIG. 1, a cable or wire termination apparatus 10 has a frame 12 with a motor 14 attached thereto. A ram 16 is attached to the motor 14 by a gearbox 18, a link (not shown) and a crankshaft (not shown). The operation of the motor 14, as is known in the industry, causes the ram 16 to be moved from between a first or open position, as shown in FIG. 2, and a second or closed position, as shown in FIG. 4.

An upper tooling member 22 is attached to the ram 16. The upper tooling member 22 includes a crimp die 24 with an arcuate surface 26. The upper tooling member 22 is moved between an open position, as shown in FIG. 2, and a crimping position, as shown in FIG. 4. The open position of the upper tooling member 22 corresponds to the open position of the ram 16. The crimping position of the upper tooling member 22 corresponds to the closed position of the ram 16.

A base plate 28 is attached to a bottom member 30 of the frame 12. A lower tooling member 32 extends from the base plate 28 in a direction toward the upper tooling member 22.

A terminal holding device 38 is positioned proximate the lower tooling member 32. The terminal holding device 38 has a terminal receiving cavity 40 for receiving a terminal 42 therein.

A clamping device 44 is provided on the base plate 28 proximate the lower tooling member 32. As shown in FIGS. 1 through 5, the clamping device 44 has clamp arms 46 which define a channel 48 for receiving the cable 36 therein. The particular configurations of the clamping device 44 may vary or may not be present without departing from the scope of the invention.

In operation, the operator places a terminal 42 in the terminal receiving cavity 40 of the terminal holding device 38. In alternate embodiments, the terminal 42 may be automatically positioned in the terminal receiving cavity 40 by a known automated process or device. In alternate embodiments, there may be no terminal holding device and the terminal may be located in the crimping area by other means.

With the terminal 42 properly positioned, an end of the cable 36 is positioned in the clamping device 44 of the lower tooling member 32. The end of the cable 36 is then moved into the terminal 42, as shown in FIG. 2. In alternate embodiments, the terminal may have a different configuration, in such the cable may be located in proximity to the terminal.

In this position, the cable 36 extends from the terminal 42 and through the channel 48 of the clamping device 44. When the cable termination device 10 is in the open position, the clamp arms 46 are in the open position shown in FIG. 2, thereby allowing for the cable 36 to be properly positioned.

Figure 3:
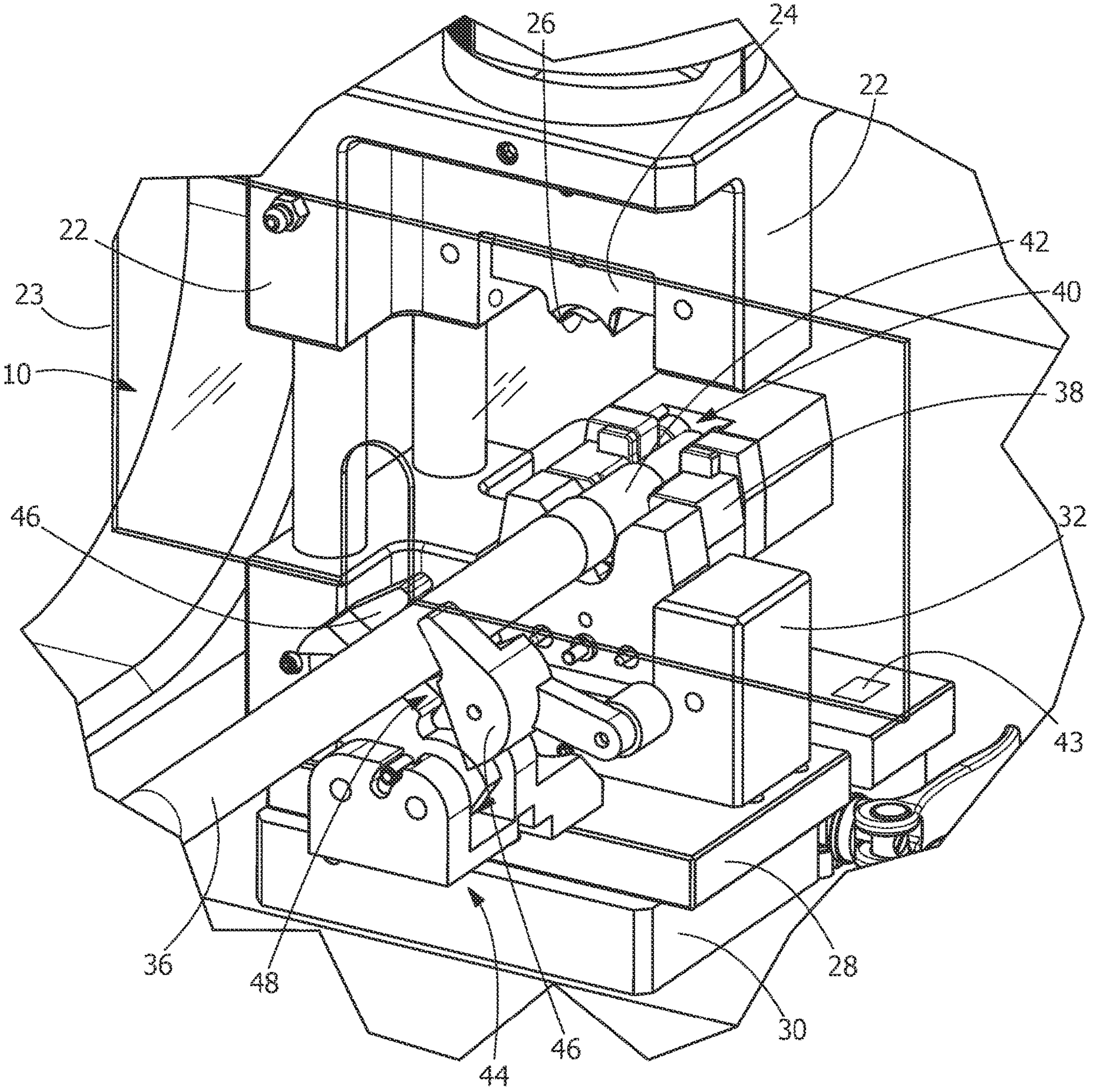
FIG. 3 is an enlarged perspective of illustrative applicator tooling of FIG. 2, with a cable positioned therein and clamped in position.

With the terminal 42 and cable 36 properly positioned, the clamp arms 46 are moved to the closed position, as shown in FIG. 3 to maintain the cable 36 in position relative to the cable termination device 10. The clamp arms 46 may be moved manually by the operator or automatically. The clamp arms 46 may be operated by known means, such as, but not limited to, hydraulic, pneumatic, spring or magnetic means.

With the cable 36 properly secured, the motor 14 is operated and drives the ram 16 and upper tooling member 22 to be moved toward the lower tooling member 32. As this occurs, the arcuate surface 26 of the crimp die 24 of the upper tooling member 22 engages the terminal 42. Continued movement of the arcuate surface 26 of the crimp die 24 of the upper tooling member 22 causes the terminal 42 to be deformed or crimped to the cable 36, as shown in FIG. 4.

As this occurs, a sensor (not shown) attached to the terminator frame 12 senses the frame deflection and thus the force required to crimp the terminal and sends this data to a process analyzer (not shown). Alternately, the sensor may be located on the upper tooling member 22, the lower tooling member 32, or at other locations in the cable termination device 10. The sensor may be a camera or other visual sensor, a displacement or distance sensor, strain, force, or other known type of sensors. The information may be in the form visual pictures, amount of displacement of the upper tooling member 22, or other know characteristics which are relevant to determine if the terminal 42 is properly secured to the cable 36. The processor will compare the information provided by the sensor to prior information of a proper crimp to determine if the crimped area of the terminal 42 is acceptable or good or if the crimped area of the terminal 42 is not acceptable or defective. The processor may be a circuit board or other circuitry which can be located at any position on the cable termination device 10 or remote from the termination device. The type of process monitor or method of determining a good crimp is not limited by this invention.

If the crimped area of the terminal 42 is acceptable or good, the processor will allow the motor 14 to operate and return the ram 16 and the upper tooling member 22 to the open position, thereby allowing the properly terminated terminal 42 and cable 36 to be removed from the cable termination device 10.

If the crimp die 24 of the upper tooling 22 is in close proximity or touching the terminal 42 and the processor determines that the crimped area of the terminal 42 is not acceptable or defective, the processor will not allow the motor 14 to be operated. This prevents the ram 16 and the upper tooling member 22 from being returned to the open position, as shown in FIG. 5, thereby preventing the removal of the terminal 42 and the cable 36 from the cable termination device 10 by the operator.

Figure 5:
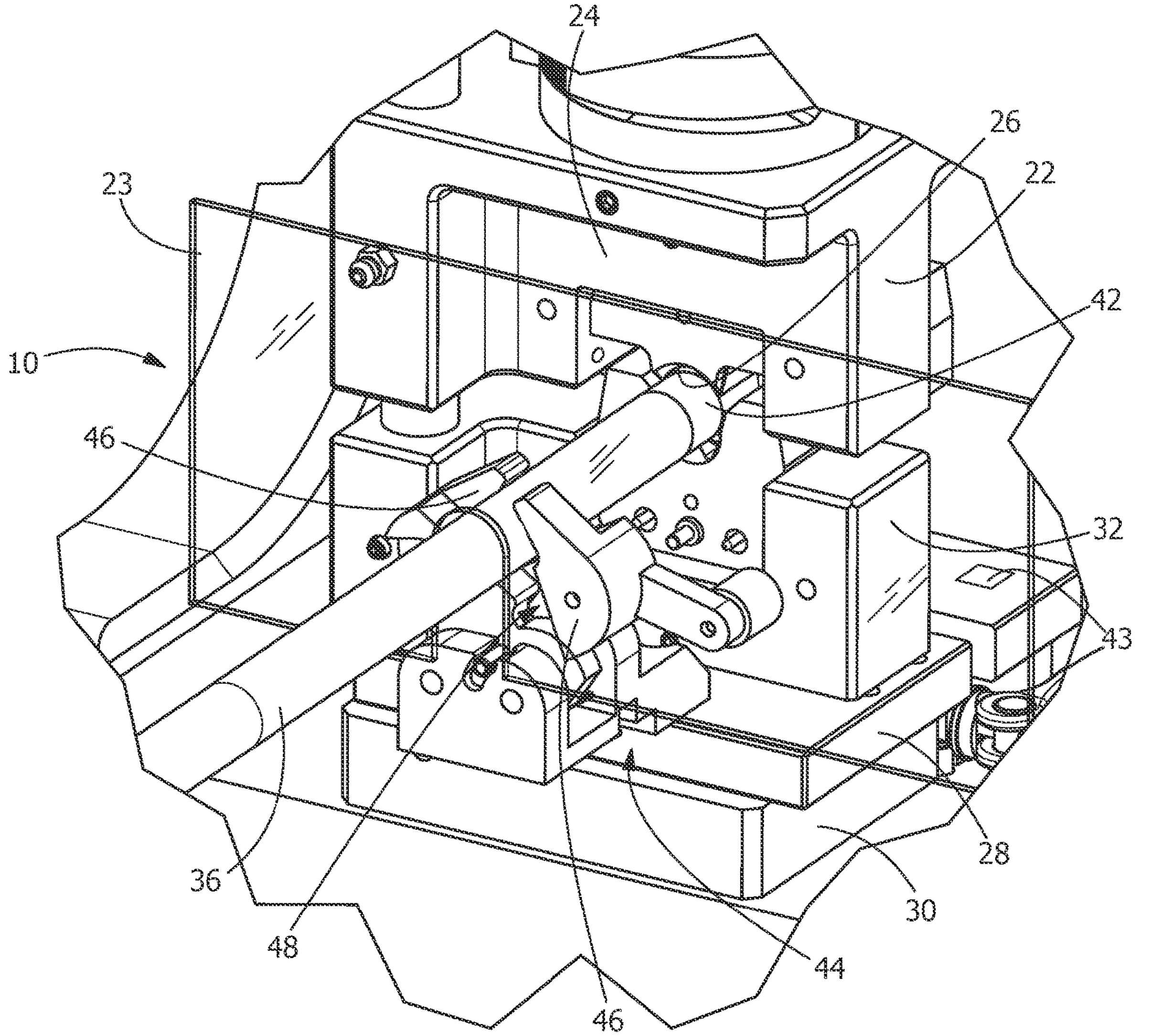
FIG. 5 is an enlarged perspective of illustrative applicator tooling of FIG. 4, with the applicator tooling moved to a lowered position in which upper tooling of the applicator tooling is retained in close proximity to a terminal crimped to the cable.

Alternatively, the crimp die 24 of the upper tooling 22 is not in close proximity or touching the terminal 42 and the processor determines that the crimped area of the terminal 42 is not acceptable or defective, the processor will signal the terminator to operate the motor and the ram 16 to move the crimp die 24 of the upper tooling 22 back to being in close proximity or touching the terminal 42, as shown in FIG. 5, thereby preventing the removal of the terminal 42 and the cable 36 from the cable termination device 10 by the operator.

In either case, the processor is secured and cannot be overrode without a proper code or key, ensuring that the crimp die 24 is maintained in close proximity to the terminal 42 to prevent the removal of the defective terminal 42. In order to move the crimp die 24 away from the defective terminal 42, a second person, such as a supervisor or a quality assurance person must the code or provide the key so that the processor can be overridden causing the crimp die 24 to be moved away from the defective terminal 42 to allow the defective crimp terminal to be removed from the terminator. This provides a method to ensure that defective crimps will be destroyed. In alternate embodiments, the defective crimp can be released by other methods. The particular method of releasing the defective crimp is not important to the idea of retaining the defective crimp by keeping the crimp die 24 of the upper tooling 22 in close proximity or touching the crimped terminal 42.

Referring to FIGS. 6 through 14, a second illustrative embodiment is shown. In this embodiment the clamping device 144 is mounted on a slide track 145 which is mounted on the base plate 28. This allows the clamping device 144 to move small distances in the direction of a longitudinal axis of the cable 36. This allows small movement of the cable 36 during crimping to prevent buckling of the cable 36 due to the cable and terminal growing in length axially due to terminal and cable extrusion during the crimping process.

FIGS. 9 through 14 show the interaction of the parts of the toggle lock clamping device 144 in a section view in which the clamp housing 171 has the outside wall removed. As shown in FIGS. 9 through 14, the toggle lock clamping device 144 has a first clamp arm 150 and a second clamp arm 152. A slide 151 is positioned between the first clamp arm and the second clamp arm 152. Dowel pin 153 is fixed mounted in the housing 171 and passes through a clearance hole in the first clamp 150 allowing the clamp 150 to rotate relative to the housing 171. A pin, 172 is fixed mounted to the first arm 150 and is engaged in slot 157 of the slide 151. Linear movement of the slide 151 along the longitudinal axis 149 of the clamping device 144 causes a rotation of the first clamp 150 relative to the housing 171. Dowel pin 173 is fixed mounted in the housing 171 and passes through a clearance hole in the second clamp arm 152 allowing the second clamp arm 152 to rotate relative to the housing 171. A pin 159 is fixed mounted to the first arm 150 and is engaged in slot (not shown) of the slide 151. Movement of the slide 151 causes a rotation of the second clamp arm 152 relative to the housing 171 and in a direction opposite the first clamp 150.

The slide 151 is attached to a spring 154 which is attached to an end wall 156 of the clamping device 144. The slide 151 is also is pivotally connected to a linkage 158 at pivot point 161. The linkage 158 is pivotably connected to a handle 160 at pivot point 163. The handle 160 is also pivotably connected to an adjustment block 162 at pivot point 165. The handle 160 has a first portion 164, which is connected to the linkage 158 and the adjustment block 162, and a second portion 166 which is pivotable connected to the first portion 164 at pivot point 167. The second portion 166 is accessible by the operator.

An adjustment screw 168 is attached to the adjustment block 162. The adjustment screw 168 extends through a wall 170 of the housing 171. The adjustment screw 168 can be moved toward or away from the adjustment block 162 to adjust the amount of rotation of the first clamp arm 150 and the second clamp arm 152. As the adjustment screw 168 is moved toward the adjustment block 162, more rotation of the of the first clamp arm 150 and the second clamp arm 152 is permitted, thereby allowing the first clamp arm 150 and the second clamp arm 152 to apply an increased force to the cable 36 to clamp the cable 36 in place to prevent the cable from being removed from the termination apparatus. As the adjustment screw 168 is moved away the adjustment block 162, less rotation of the first clamp arm 150 and the second clamp arm 152 is permitted, thereby allowing the first clamp arm 150 and the second clamp arm 152 to apply a decreased force to the cable 36 to clamp the cable 36 in place while preventing the cable from being damaged when being clamped.

The toggle clamping device 144 shown in FIGS. 6 through 14 is meant to be illustrative. Other types and configurations of the clamping device may be used without departing from the scope of the invention.

In operation, the operator places a terminal 42 in the terminal receiving cavity 40 of the terminal holding device 38. In alternate embodiments, the terminal 42 may be automatically positioned in the terminal receiving cavity 40 by a known automated process or device.

Figure 6:
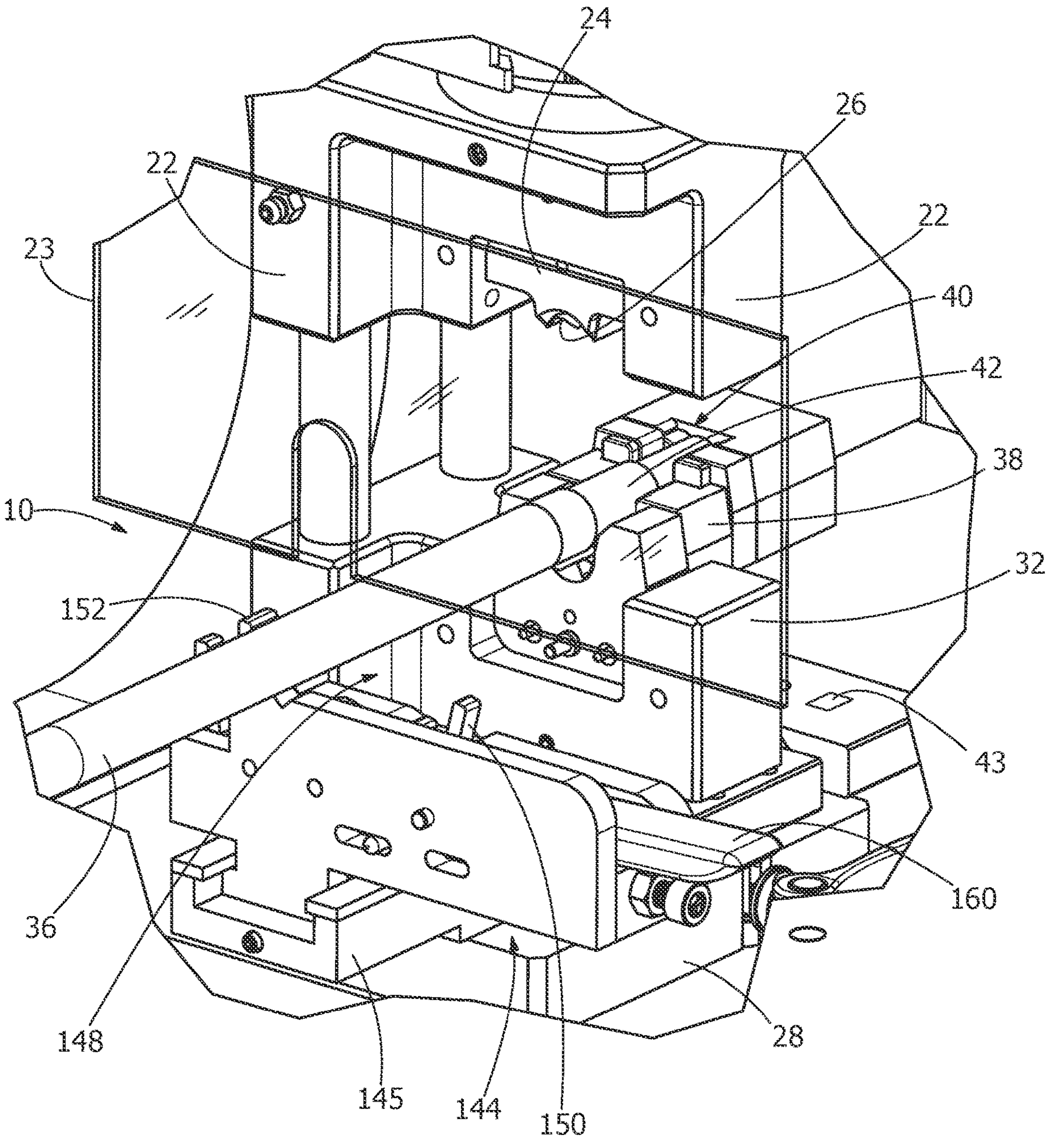
FIG. 6 is an enlarged perspective of a second illustrative embodiment of the applicator tooling shown in an open position.

With the terminal 42 properly positioned, an end of the cable 36 is positioned in the clamping device 144. The end of the cable 36 is then moved into the terminal 42, as shown in FIG. 6. In alternate embodiments, the terminal may have a different configuration, in such the cable may be located in proximity to the terminal.

Figure 9:
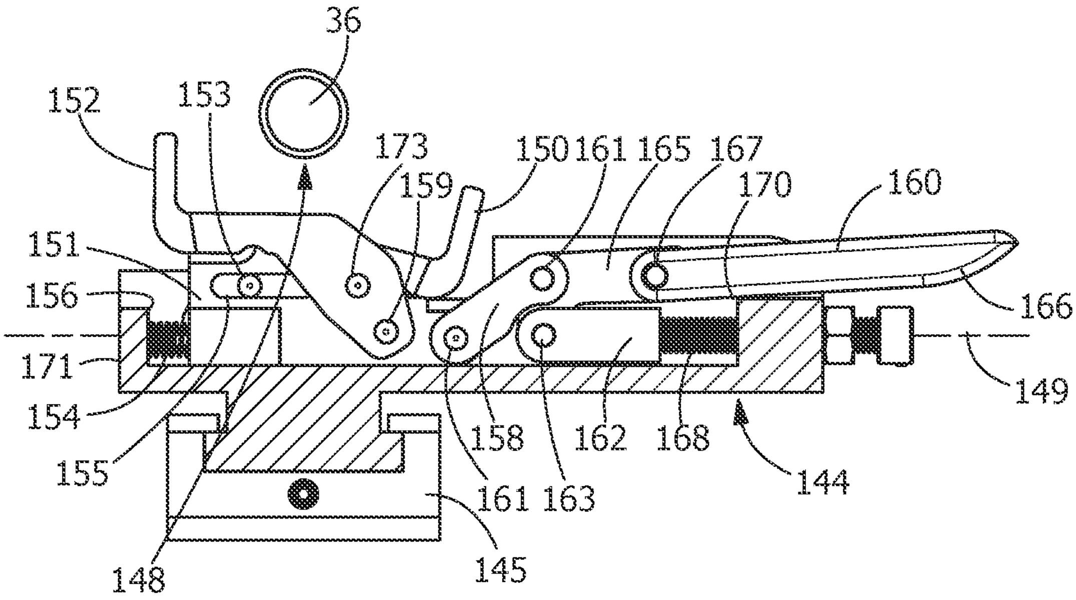
FIG. 9 is cross-sectional view of the cable clamp of FIG. 6 shown in an open position.
Figure 10:
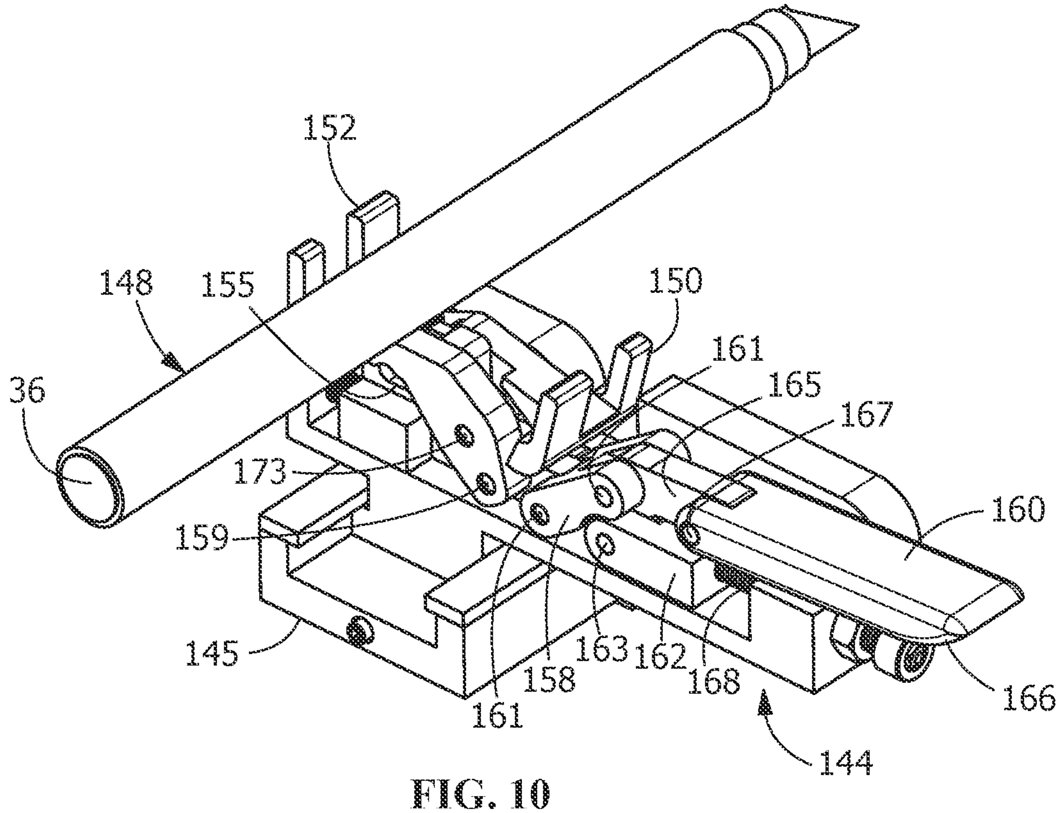
FIG. 10 is a perspective view of the cable clamp of FIG. 9 shown in the open position.

In this position, the cable 36 extends from the terminal 42 and through the channel 148 of the clamping device 144. When the cable termination device 10 is in the open position, the clamp arms 150, 152 are in the open position shown in FIG. 6, thereby allowing for the cable 36 to be properly positioned. As shown in FIGS. 9 and 10, in the open position, the first clamp arm 150 and the second clamp arm 152 are spaced apart to form the cable receiving channel 148. In this position the spring 154 exerts a force on the slide 151 to retain the slide 151 in the position shown in FIGS. 9 and 10, thereby maintaining the first clamp arm 150 and the second clamp arm 152 in the open position.

Figure 7:
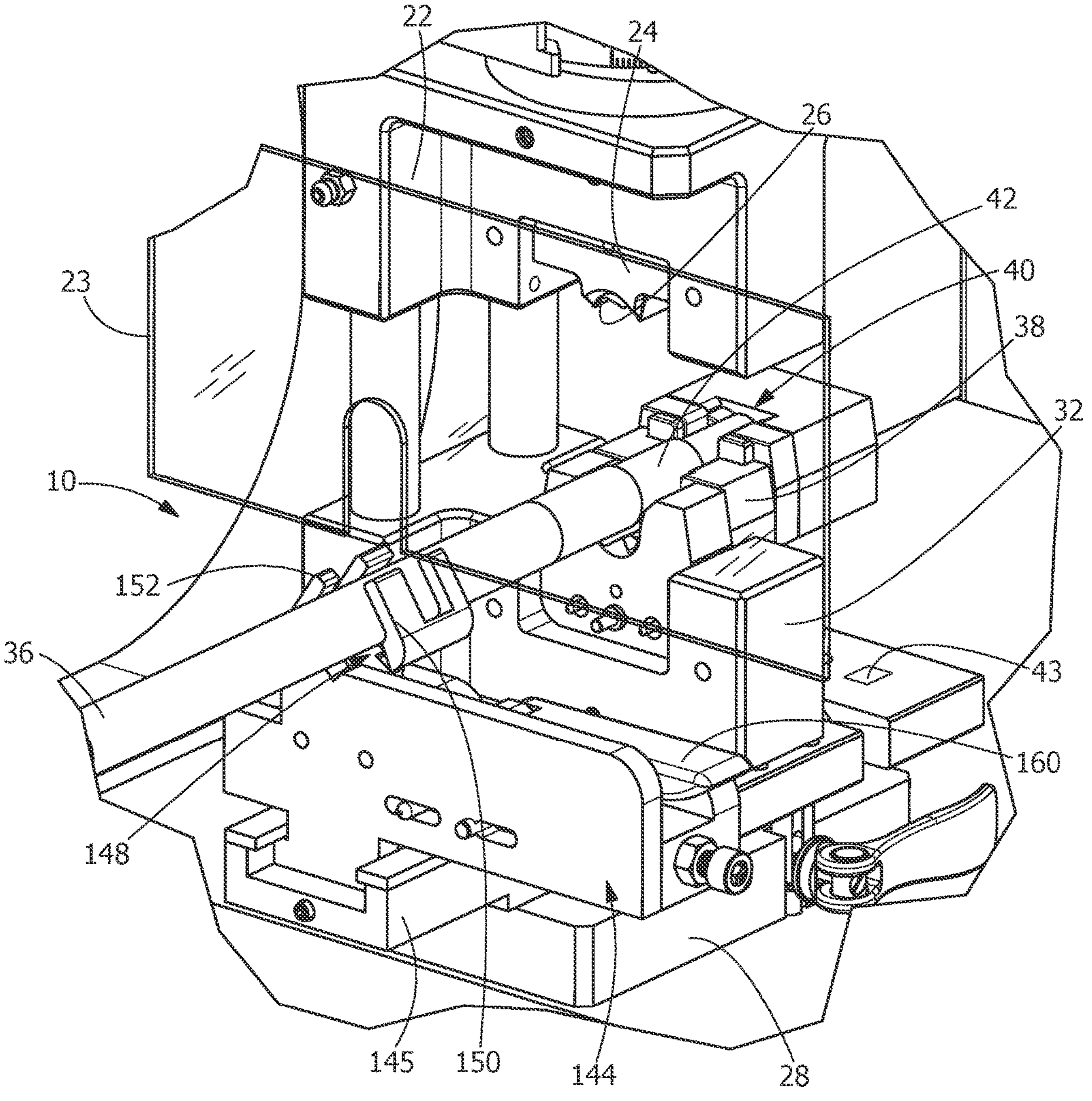
FIG. 7 is an enlarged perspective of illustrative applicator tooling of FIG. 6, with a cable positioned therein and clamped in position.
Figure 8:
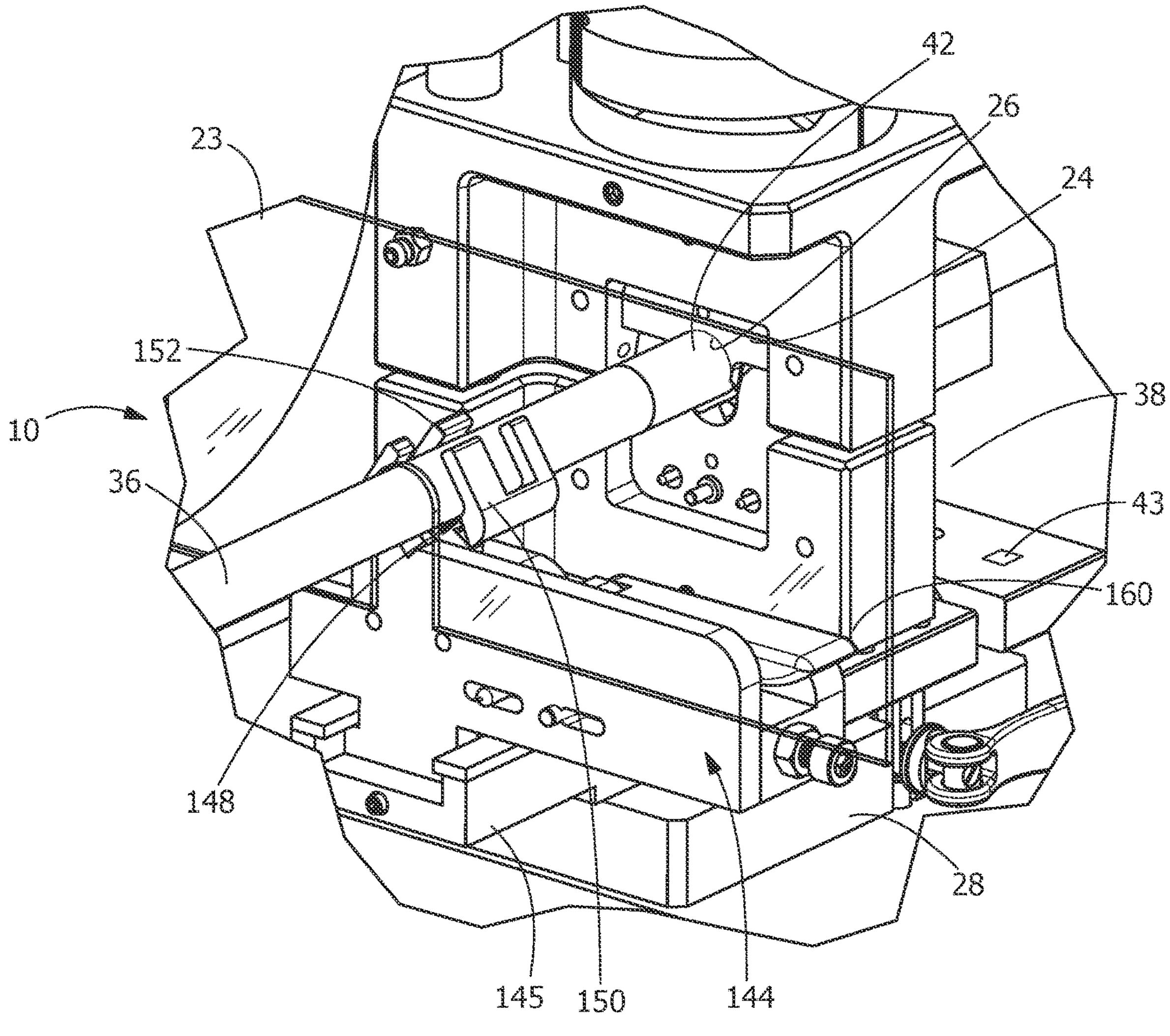
FIG. 8 is an enlarged perspective of illustrative applicator tooling of FIG. 6, with the applicator tooling moved to a closed position.
Figure 11:
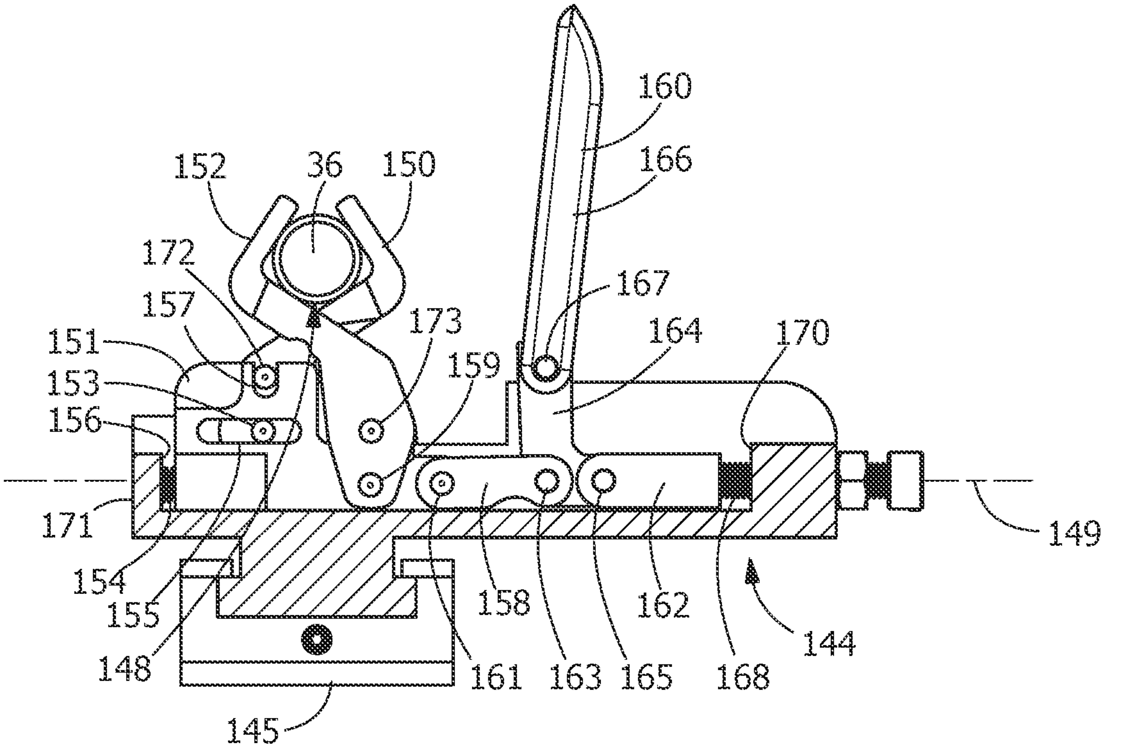
FIG. 11 is cross-sectional view of the cable clamp shown in FIG. 9, with the cable clamp shown in a partially closed position.
Figure 12:
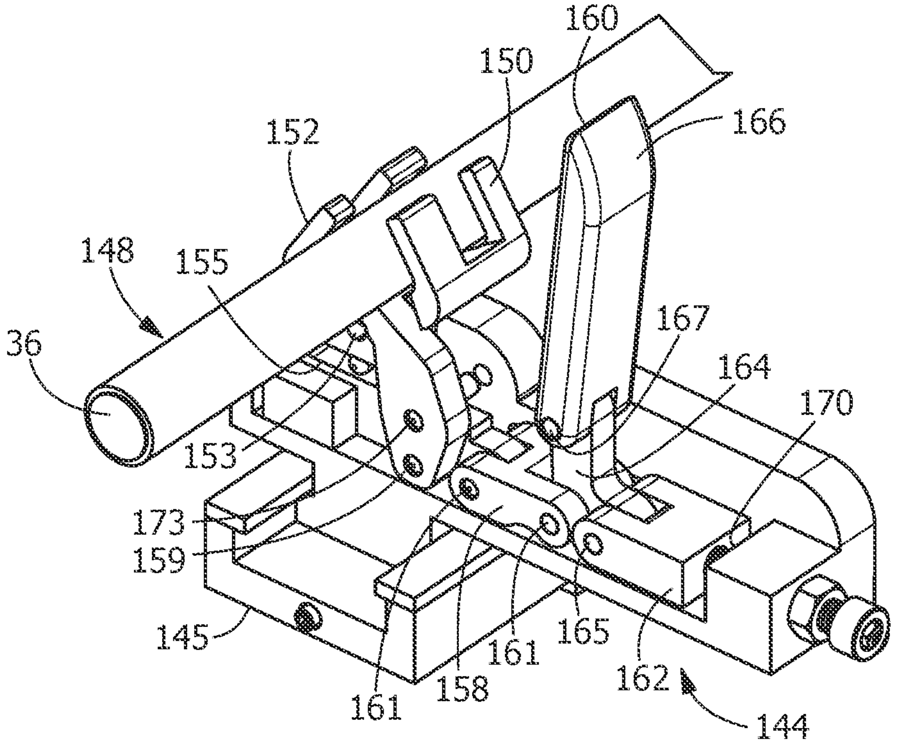
FIG. 12 is a perspective view of the cable clamp of FIG. 11 shown in the partially closed position.

With the terminal 42 and cable 36 properly positioned, the handle 160 is moved from the position shown in FIGS. 9 and 10 to the position shown in FIGS. 11 and 12. As this occurs the linkage 158 is pivoted about pivot point 163, which in turn causes the slide 151 to move toward wall 156. The linkage 158 is positioned and maintained in line with adjustment block 162 to retain the linkage in the position shown in FIGS. 11 and 12. The causes the first clamp arm 150 and the second clamp arm 152 to rotate relative to the base plate 151, causing the clamp arms 150, 152 to be moved to the closed position, as shown in FIG. 7, to maintain the cable 36 in position relative to the cable termination device 10. In this position, the spring 154 is resiliently deformed in a compressed position. The positioning of the linkage 158 in line with the adjustment block 162 prevents the mechanism from unwanted movement from the closed position.

Figure 13:
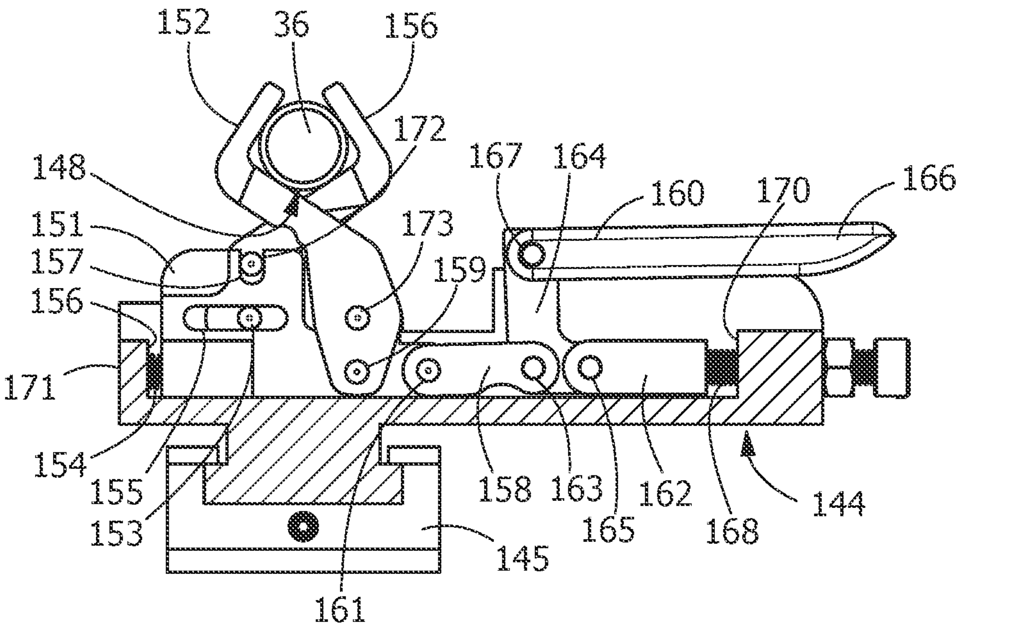
FIG. 13 is cross-sectional view of the cable clamp shown in FIG. 11, with the cable clamp shown in a fully closed position.
Figure 14:
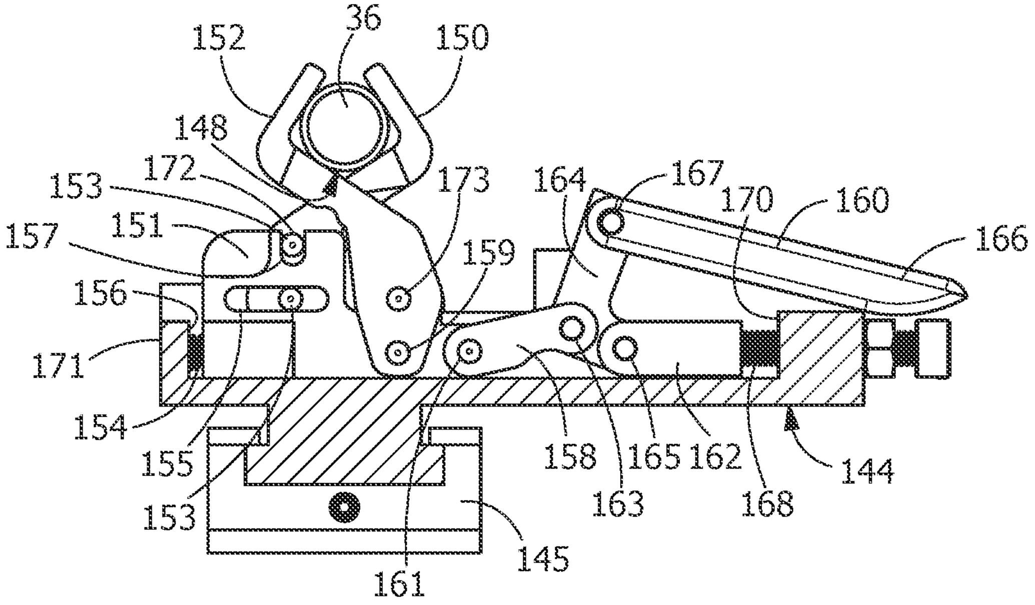
FIG. 14 is cross-sectional view of the cable clamp shown in FIG. 13, with the cable clamp shown in a partially open position.

The handle 160 is free to pivot downward, as shown in FIG. 13, to prevent the operator from reaching through the guards 23 and releasing the cable 36 from the clamp arms 150 and 152. The pivoting of the handle 160 does not cause the first clamp arm 150 or the second clamp arm 152 to move. With the cable 36 properly secured and the handle 160 properly positioned, the motor 14 of the termination apparatus is operated and drives the ram 16 and upper tooling member 22 to be moved as previously described thus crimping the terminal 142 onto the cable 36. The motor 14 continues operation, causing the ram 16 and the upper tooling member 22 to be withdrawn or removed from the terminal 42.

Once the ram 16 and the upper tooling member 22 reach the closed position, the motor 14 is reversed, causing the ram 16 and the upper tooling member 22 to be withdrawn or removed from the terminal 42. As crimping occurs, a sensor (not shown) attached to the terminator frame 12 senses the frame deflection and thus the force required to crimp the terminal and sends this data to a process analyzer (not shown). The sensor may be located on the upper tooling member 22, the lower tooling member 32, or at other locations in the cable termination device 10. The sensor may be a camera or other visual sensor, a displacement or distance sensor, strain, force, or other known type of sensors. The information may be in the form visual pictures, amount of displacement of the upper tooling member 22, or other know characteristics which are relevant to determine if the terminal 42 is properly secured to the cable 36. The processor will compare the information provided by the sensor to prior information of a proper crimp to determine if the crimped area of the terminal 42 is acceptable or good or if the crimped area of the terminal 42 is not acceptable or defective. The processor may be a circuit board or other circuitry which can be located at any position on the cable termination device 10 or remote from the termination device.

If the crimped area of the terminal 42 is acceptable or good, the terminating apparatus will open the guard 23 or allow the guard 23 to be opened. Opening the guard will allow the operator to access the handle 160 and to move the handle 160 to the position shown in FIG. 14. With the handle 160 moved, the linkage 158 is moved from the housing 171, allowing the spring 154 to return toward an unstressed position, which in turn, allows the slide 151 and the clamp arms 150, 152 to return to the open position. With the clamp arms 150, 152 in the open position, the properly terminated terminal 42 and cable 36 may be removed from the cable termination device 10.

However, if the crimped area of the terminal 42 is not acceptable or defective, the terminating apparatus will not open the guard 23 or not allow the guard 23 to be opened, thereby preventing the operator from accessing the handle 160 and thereby preventing the clamping device 144 from being moved to the open position. This prevents removal of the terminal 42 and the cable 36 from the cable termination device 10 by the operator.

The processor is secured and cannot be overrode without a proper code or key. Therefore, if a defective crimp is detected, a second person, such as a supervisor or a quality assurance person, must enter the code or provide the key so that the defective crimp terminal can be removed from the terminator. This ensures that defective crimps will be destroyed. In alternate embodiments, the defective crimp can be released by other methods. The method of releasing the defective crimp is not important to the idea of retaining the defective crimp by retaining the cable in a clamping device that was locked prior to cable termination and cannot be unlocked when the guards are not opened or are prevented from being opened after detecting a defective crimp.

Referring to FIGS. 15 through 23, a third illustrative embodiment is shown. In this embodiment the clamping device 244 is mounted on the base plate 28.

FIGS. 18 through 23 show the interaction of the parts of the toggle clamp in a section view in which the clamp housing 271 has the outside wall removed. The toggle lock clamping device 244 has a first clamp arm 250 and a second clamp arm 252. A slide 251 is positioned between the first clamp arm 250 and the second clamp arm 252. Dowel pin 253 is fixed mounted in the housing 271 and passes through a clearance hole in the first clamp arm 250 allowing the first clamp arm 250 to rotate relative to the housing 271. A pin, 269 is fixed mounted to the first clamp arm 250 and is engaged in slot 257 of the slide 251. Linear movement of the slide 251 along the longitudinal axis 249 of the clamping device 244 causes a rotation of the first clamp arm 250 relative to the housing 271. Dowel pin 259 is fixed mounted in the housing 271 and passes through a clearance hole in the second clamp arm 252 allowing the second clamp arm 252 to rotate relative to the housing 271. A pin, 270 is fixed mounted to the first clamp arm 250 and is engaged in slot (not shown) of the slide 251. Movement of the slide 251 causes a rotation of the second clamp arm 252 relative to the housing 271 and in a direction opposite the first clamp arm 250.

The slide 251 is attached to a spring 254 which is attached to an end wall 256 of the clamping device 244. The slide 251 is also is pivotally connected to a linkage 258 at pin 261. The linkage 258 is pivotably connected to a handle 260 at pin 263. Dowel pin 272 is fixed mounted in the housing 271 and passes through a clearance hole in the handle 260 allowing the handle 260 to rotate relative to the housing 271. Pin 263 is mounted in linkage 258 and is engaged in slot 264 of handle 260.

Figure 18:
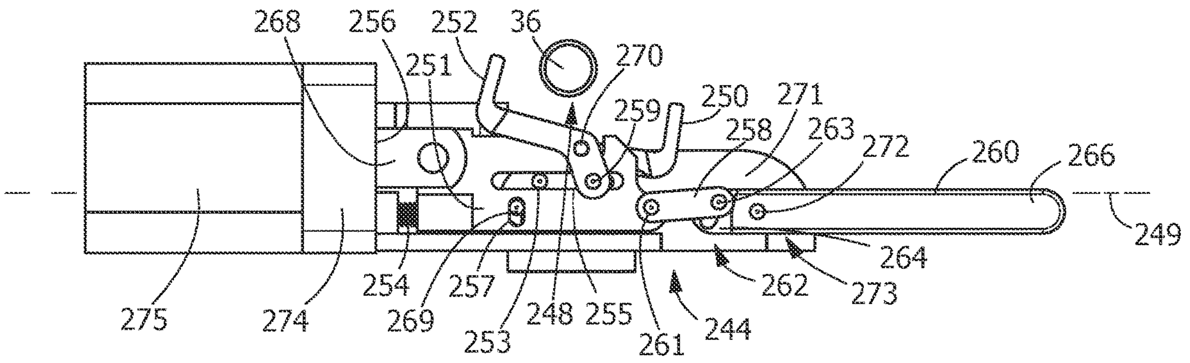
FIG. 18 is cross-sectional view of the cable clamp of FIG. 15 shown in an open position.
Figure 19:
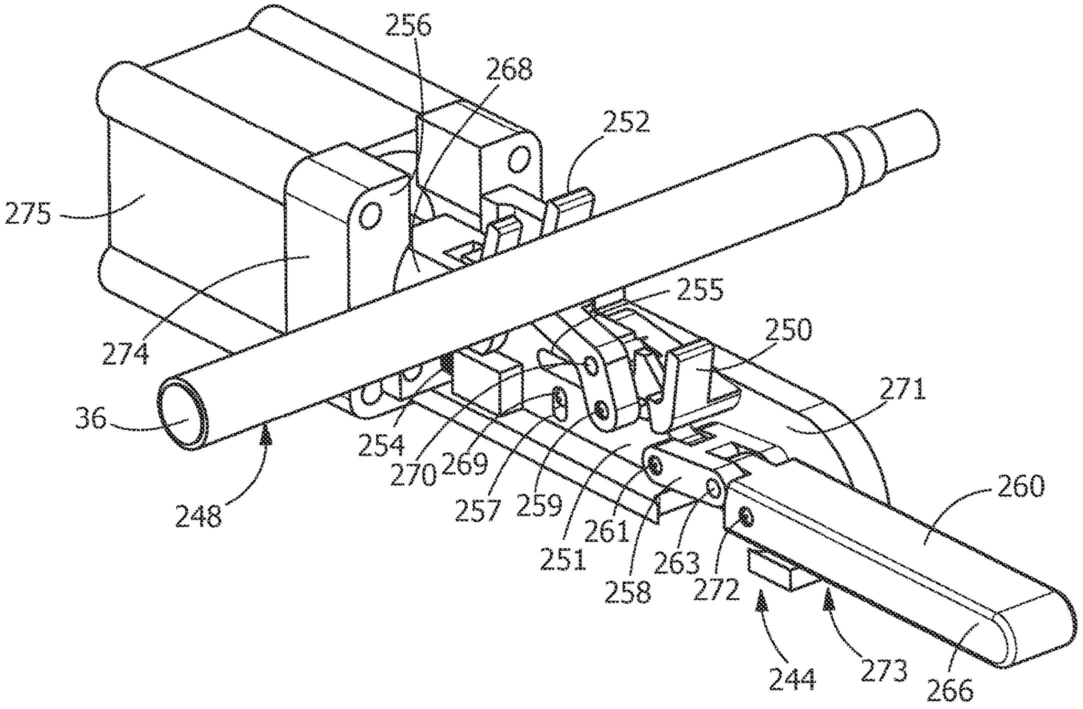
FIG. 19 is a perspective view of the cable clamp of FIG. 18 shown in the open position.
Figure 20:
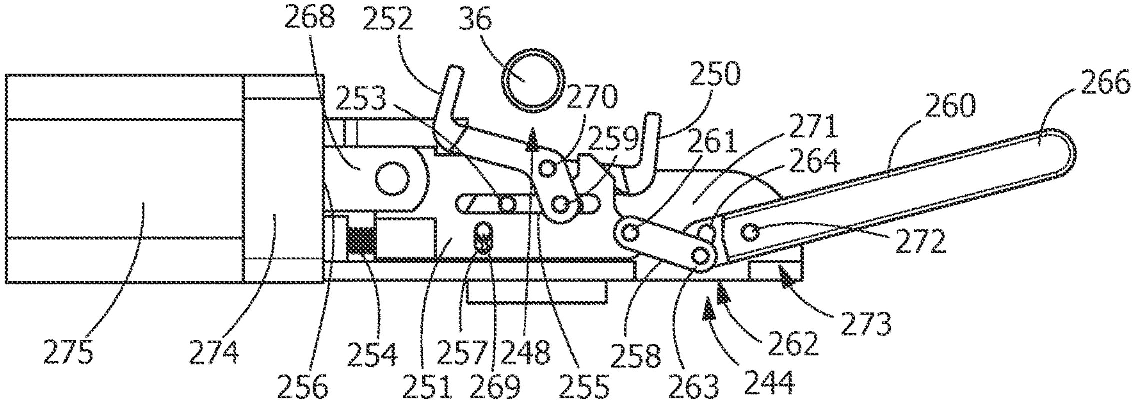
FIG. 20 is cross-sectional view of the cable clamp shown in FIG. 18, with the cable clamp shown in a partially closed position.
Figure 21:
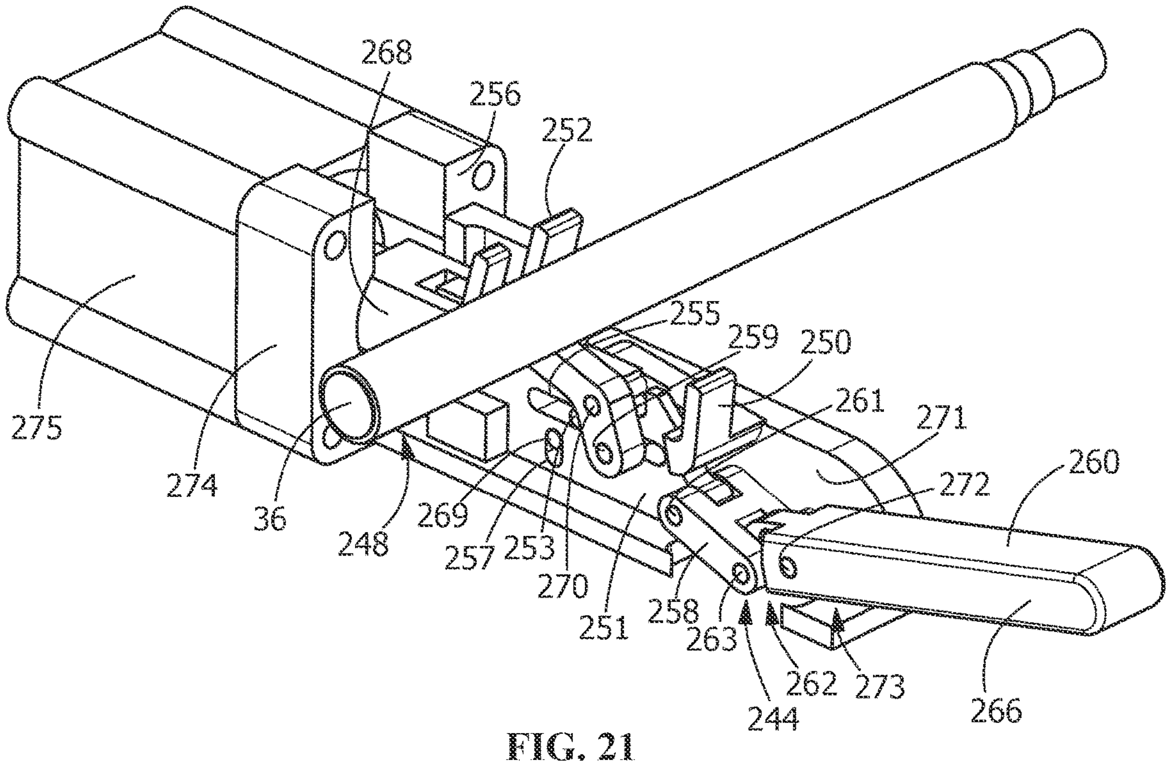
FIG. 21 is a perspective view of the cable clamp of FIG. 20 shown in the partially closed position.

FIGS. 18 and 19 show the clamping device with the first clamp arm 250 and second clamp arm 252 rotated away from cable 36. This condition is the load condition. In this condition, spring member 254 is applying a force to the slide 251 to push it toward the handle 260. The pin 263 of linkage 258 is above the centerlines of pin 261 and 272. This pushes the handle 260 into housing 271 at point 273 which prevents the mechanism from moving.

An air cylinder 275 is attached to the adapter 274 which mounts to the housing 271. The air cylinder 275 extends through the adapter 274 and engages the slide 251 through clevis 268. When first clamp arm 250 and second clamp arm 252 are rotated to engage with the cable 36, air pressure applied to the extend side of the air cylinder 275 will cause the air cylinder to apply extra or additional clamping force to the clamp arms. When first clamp arm 250 and second clamp arm 252 are rotated to engage with the cable 36, air pressure applied to the retract side of the air cylinder 275 will cause the air cylinder to move slide 251 away from the handle 260 and rotate first clamp arm 250 and second clamp arm 252 to the open position. Moving the slide 251 away from the handle 260 will cause the handle to rotate clockwise until is stops at stop surface 273 on housing 271.

The toggle clamping device 244 shown in FIGS. 15 through 23 is meant to be illustrative. Other types and configurations of the clamping device may be used without departing from the scope of the invention.

In operation, the operator places a terminal 42 in the terminal receiving cavity 40 of the terminal holding device 38. In alternate embodiments, the terminal 42 may be automatically positioned in the terminal receiving cavity 40 by a known automated process or device.

Figure 15:
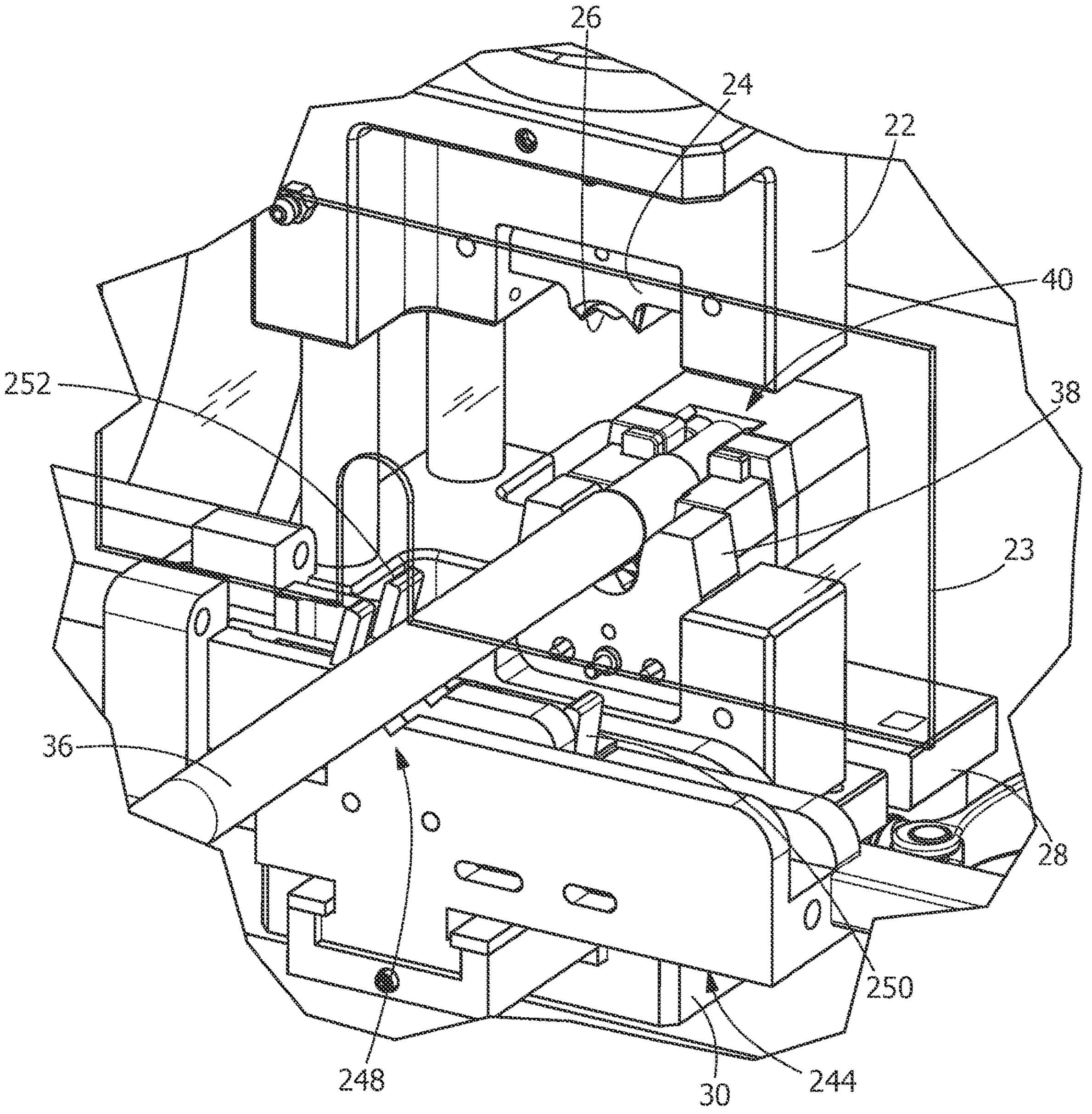
FIG. 15 is an enlarged perspective of a third illustrative embodiment of the applicator tooling shown in an open position.
Figure 16:
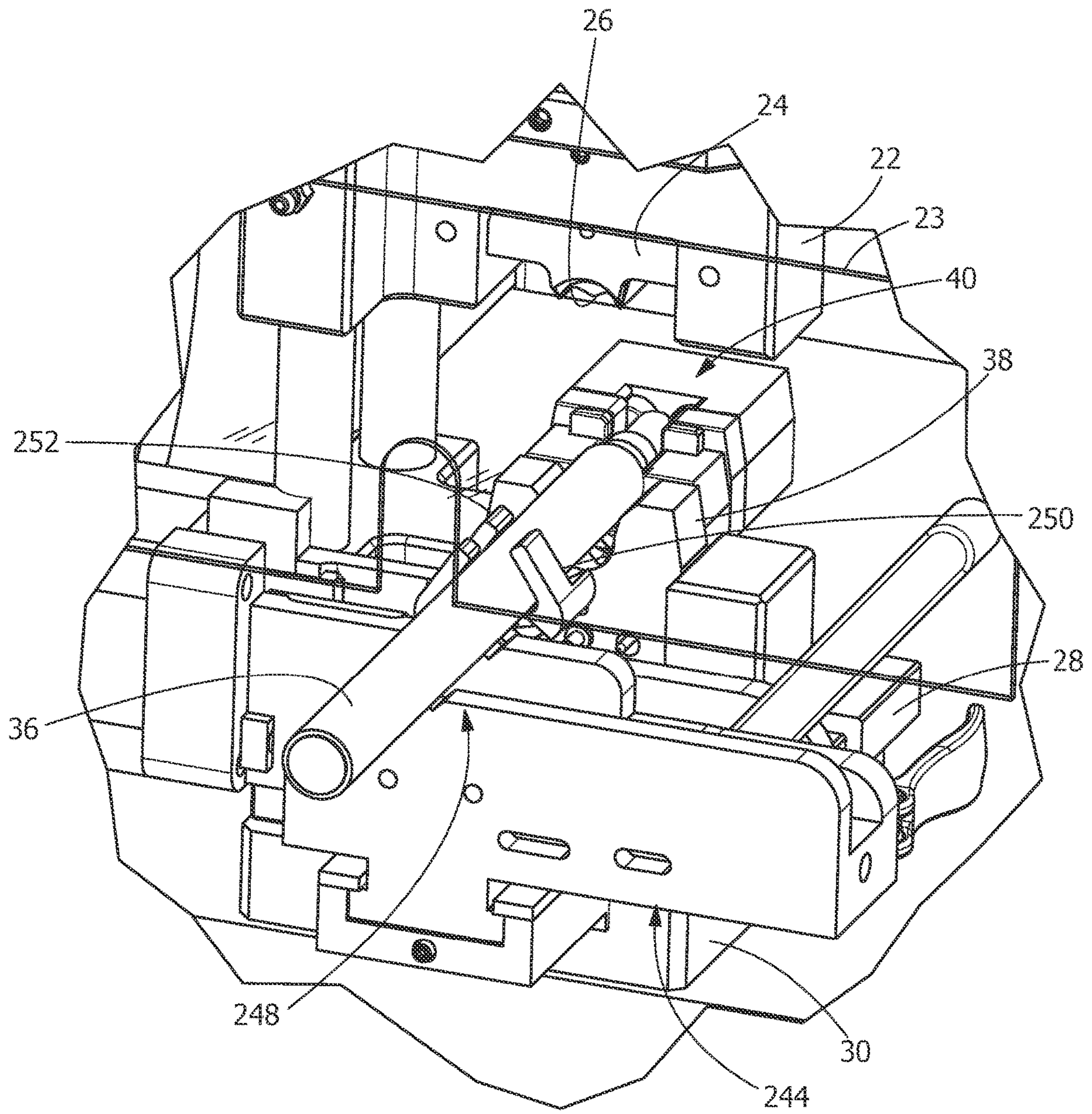
FIG. 16 is an enlarged perspective of illustrative applicator tooling of FIG. 13, with a cable positioned therein and clamped in position.
Figure 17:
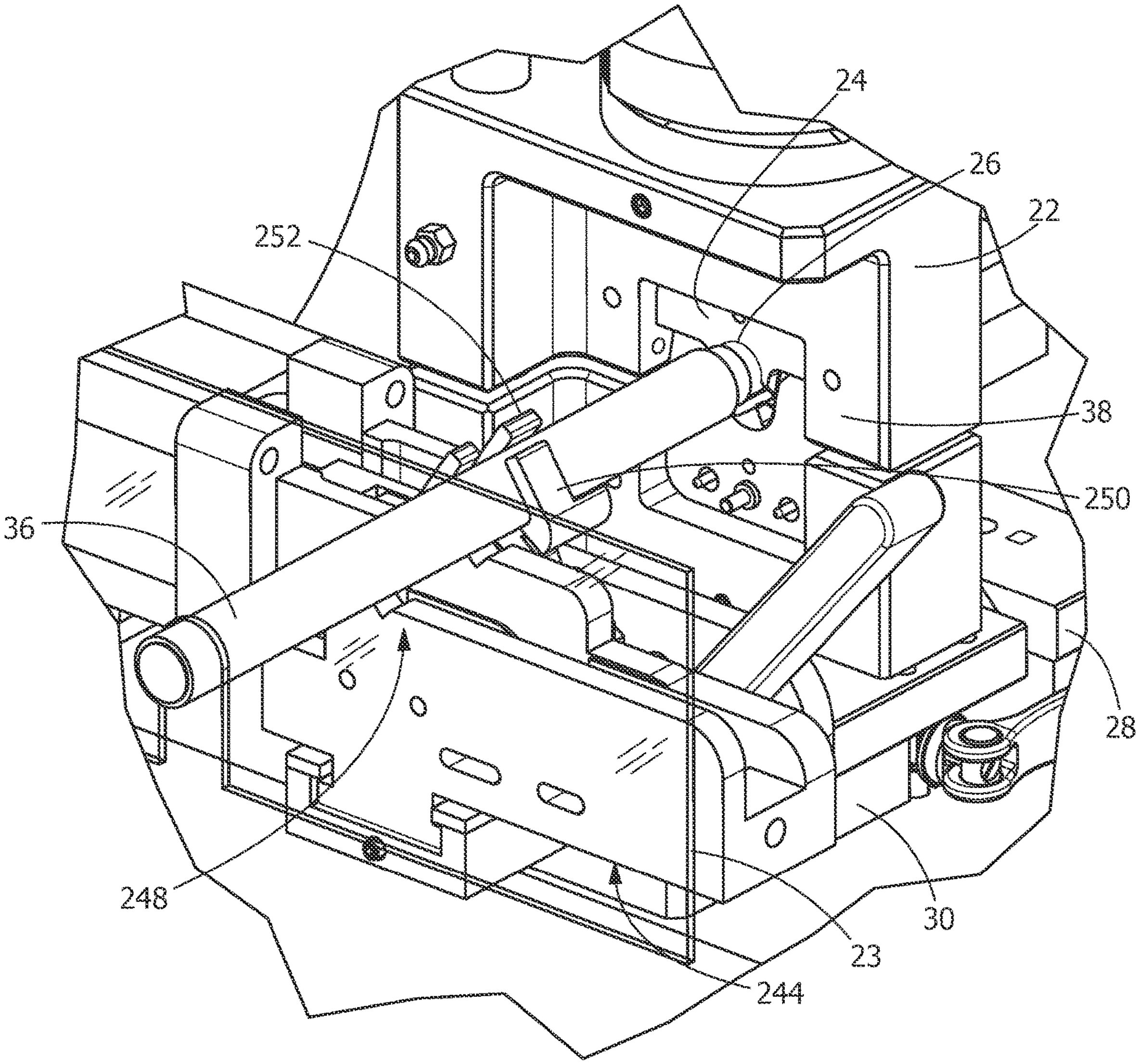
FIG. 17 is an enlarged perspective of illustrative applicator tooling of FIG. 13, with the applicator tooling moved to a closed position.

With the terminal 42 properly positioned, an end of the cable 36 is positioned in the clamping device 244. The end of the cable 36 is then moved into the terminal 42, as shown in FIG. 15.

In this position, the cable 36 extends from the terminal 42 and through the channel 248 of the clamping device 244. Prior to loading a cable, the clamp arms 250, 252 are in the open position shown in FIG. 15, thereby allowing for the cable 36 to be properly positioned. As shown in FIGS. 18 and 19, in the open position, the first clamp arm 250 and the second clamp arm 252 are spaced apart to form the cable receiving channel 248. In this position the spring 254 exerts a force on the slide 251 which exerts a force onto the link 258 through pin 261. This causes pin 263 to move to the right and up in slot 264 of handle 260 and exert a force to push the handle 260 in a clockwise direction relative to FIGS. 18 and 19. The handle 260 is prevented from rotating further than the position shown in the FIGS. 18 and 19 by stop surface 273 of housing 271. This condition will retain the slide 251 in the position shown in FIGS. 18 and 19, thereby maintaining the first clamp arm 250 and the second clamp arm 152 in the open position.

Figure 22:
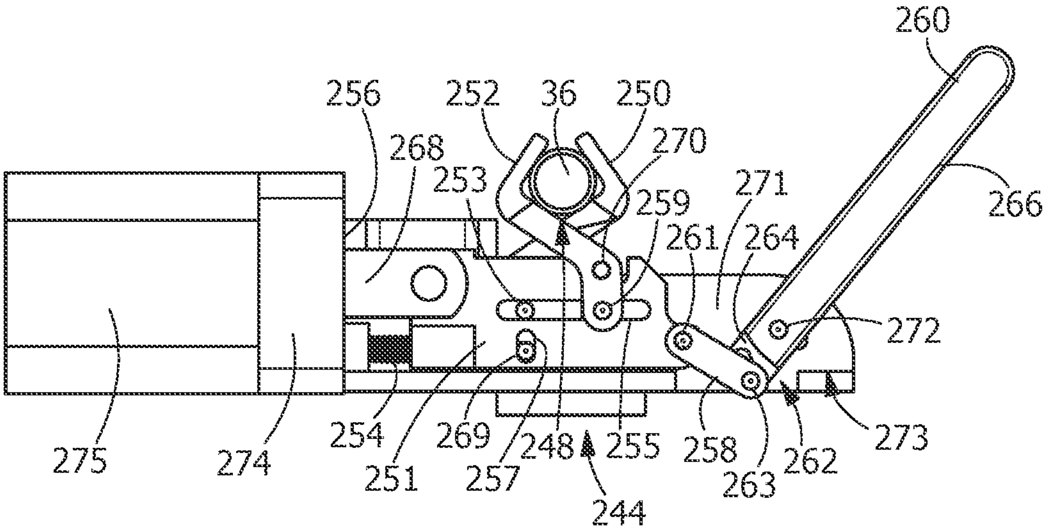
FIG. 22 is cross-sectional view of the cable clamp shown in FIG. 20, with the cable clamp shown in a fully closed position.
Figure 23:
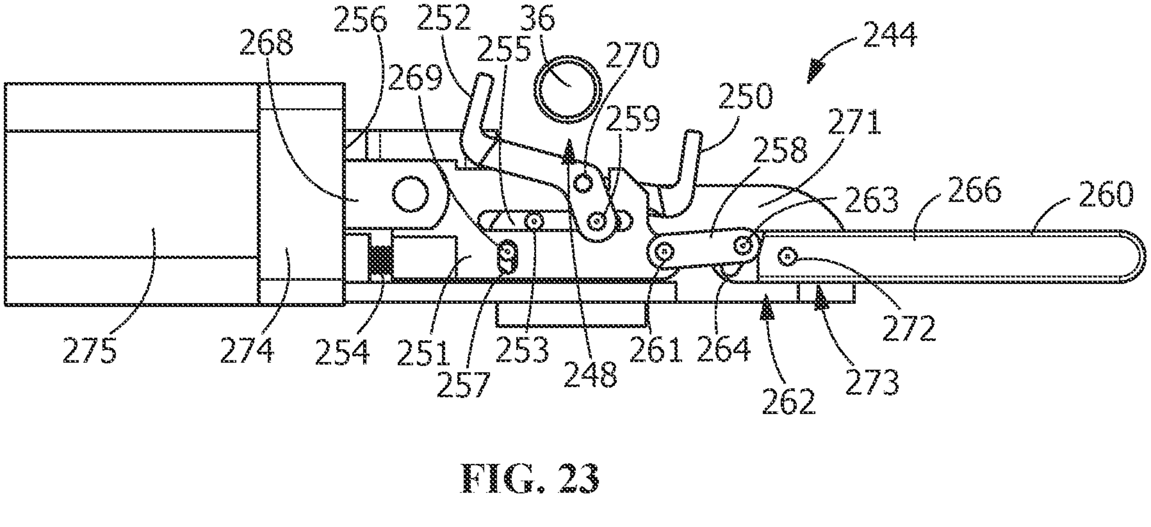
FIG. 23 is cross-sectional view of the cable clamp shown in FIG. 22, with the cable clamp shown in a partially open position.

With the terminal 42 and cable 36 properly positioned, the handle 260 is moved from the position shown in FIGS. 18 and 19 to the position shown in FIG. 22. As this occurs the linkage 258 is pivoted about pin 263 and is moved into recess 262. Once the pin 263 of link 258 passes below the centerlines between pin 272 and pin 261, spring 254 will apply a force to move slide 251 toward the handle 260. This will cause the first clamp arm 250 and the second clamp arm 252 to rotate toward cable 36 until they stop against cable 36 with a small force. This small force will allow cable 36 to move axially in the clamp arms 250 and 252 due to cable and terminal extrusion during the crimping process.

With the cable 36 properly secured, the motor 14 of the termination apparatus is operated and drives the ram 16 and upper tooling member 22 to be moved as previously described thus crimping the terminal 142 onto the cable 36. The motor 14 continues operation, causing the ram 16 and the upper tooling member 22 to be withdrawn or removed from the terminal 42.

As crimping occurs, a sensor (not shown) attached to the terminator frame 12 senses the frame deflection and thus the force required to crimp the terminal and sends this data to a process analyzer (not shown). The sensor may be located on the upper tooling member 22, the lower tooling member 32, or at other locations in the cable termination device 10. The sensor may be a camera or other visual sensor, a displacement or distance sensor, strain, force, or other known type of sensors. The information may be in the form visual pictures, amount of displacement of the upper tooling member 22, or other know characteristics which are relevant to determine if terminal 42 is properly secured to the cable 36. The processor will compare the information provided by the sensor to prior information of a proper crimp to determine if the crimped area of the terminal 42 is acceptable or good or if the crimped area of the terminal 42 is not acceptable or defective. The processor may be a circuit board or other circuitry which can be located at any position on the cable termination device 10 or remote from the termination device.

If the crimped area of the terminal 42 is acceptable or good, the terminating apparatus will apply air pressure to the retract side of the air cylinder 275. This will cause the clevis 268 to move away from the handle causing the slide 251 to move away from the handle. This action will cause the clamp arms 250 and 252 to rotate away from the cable 36 to an open position. The action of the slide 251 moving away from handle 260 will cause link 258 to pull on the handle 260 and cause it to rotate clockwise until the handle 260 stops against stop surface 273 of housing 271.

Alternately, the handle 260 may be manually rotated clockwise until movement is stopped by stop surface 273 of housing 271. The handle 260 rotating clockwise will apply a force to link 258 through pin 263 which will cause slide 251 to move away from the handle. This action will cause the clamp arms 250 and 252 to rotate away from the cable 36 to an open position. Movement of slide 251 away from the handle will also cause the clevis 268 to move away from the handle 260 and push the rod of air cylinder 275 back into the air cylinder.

However, if the crimped area of the terminal 42 is not acceptable or defective, the terminating apparatus will not open the guard 23 or not allow the guard 23 to be opened. The terminating apparatus 10 will supply air pressure to the extend side of air cylinder 275. This will cause the air cylinder 275 to apply extra force to slide 251 through the clevis 268. The extra force applied to slide 251 will cause the clamp arms 250 and 252 to apply extra grip force to the cable, which prevents removal of the terminal 42 and the cable 36 from the cable termination device 10 by the operator.

The processor is secured and cannot be overrode without a proper code or key. Therefore, if a defective crimp is detected, a second person, such as a supervisor or a quality assurance person, must enter the code or provide the key so that the defective crimp terminal can be removed from the terminator. This ensures that defective crimps will be destroyed. In alternate embodiments, the defective crimp can be released by other methods. The method of releasing the defective crimp is not important to the idea of retaining the defective crimp by retaining the cable in a clamping device that was locked prior to cable termination and cannot be unlocked when the guards are not opened or are prevented from being opened after detecting a defective crimp.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A wire termination apparatus for terminating an electrical terminal to a wire or cable, the wire termination apparatus comprising:

an upper tooling member attached to a ram, the upper tooling member having a crimp die, the upper tooling movable between an open position and a closed position;

a lower tooling member attached to a base member of a frame of the wire termination apparatus;

a process analyzer which determines if a crimped terminal is properly crimped to a wire or cable;

wherein if process analyzer determines that the terminal has not been properly crimped to the cable, the upper tooling member is prevented from returning to the open position thus preventing the removal of the defectively crimped terminal and wire or cable from the wire termination apparatus.

2. The wire termination apparatus as recited in claim 1, wherein a terminal holding device is positioned proximate the lower tooling member, the terminal holding device has a terminal receiving cavity.

3. The wire termination apparatus as recited in claim 1, wherein if terminal has not been properly crimped to the cable, the processor requires a code or key to allow the upper tooling member to return to the open position.

4. A wire termination apparatus for terminating an electrical terminal to a wire or cable, the wire termination apparatus comprising:

an upper tooling member attached to a ram, the upper tooling member having a crimp die, the upper tooling movable between an open position and a closed position;

a lower tooling member attached to a base member of a frame of the wire termination apparatus;

a process analyzer which determines if a crimped terminal is properly crimped to a wire or cable;

wherein if process analyzer determines that the terminal has not been properly crimped to the wire or cable and the upper tooling is not in close proximity to the defectively crimped terminal, the upper tooling member is returned to a position in contact with or within close proximity of the defectively crimped terminal thus preventing the defectively crimped terminal and wire or cable from being removed from the termination apparatus.

5. The wire termination apparatus as recited in claim 4, wherein a terminal holding device is positioned proximate the lower tooling member, the terminal holding device has a terminal receiving cavity.

6. The wire termination apparatus as recited in claim 4, wherein if terminal has not been properly crimped to the cable, the processor requires a code or key to allow the upper tooling member to return to the open position.

* * * * *